United States Patent
Robin

(10) Patent No.: US 10,286,242 B2
(45) Date of Patent: May 14, 2019

(54) AZEOTROPIC AND AZEOTROPE-LIKE COMPOSITIONS OF HFO-E-1,3,4,4,4-PENTAFLUORO-3-TRIFLUOROMETHYL-1-BUTENE AND USES THEREOF

(71) Applicant: The Chemours Company FC, LLC, Wilmington, DE (US)

(72) Inventor: Mark L. Robin, Middletown, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 0 days.

(21) Appl. No.: 16/165,083

(22) Filed: Oct. 19, 2018

(65) Prior Publication Data

US 2019/0046824 A1 Feb. 14, 2019

Related U.S. Application Data

(62) Division of application No. 15/323,982, filed as application No. PCT/US2015/041666 on Jul. 23, 2015.

(Continued)

(51) Int. Cl.
*A62D 1/00* (2006.01)
*C09K 5/04* (2006.01)
(Continued)

(52) U.S. Cl.
CPC .............. *A62D 1/0057* (2013.01); *A62D 1/00* (2013.01); *C08J 9/146* (2013.01); *C08J 9/149* (2013.01);
(Continued)

(58) Field of Classification Search
None
See application file for complete search history.

(56) References Cited

U.S. PATENT DOCUMENTS 8,658,708 B2* 2/2014 Loh .................... C08G 18/5027
521/131
2008/0011678 A1* 1/2008 Knapp .................... C07C 17/38
210/634
(Continued)

FOREIGN PATENT DOCUMENTS

WO   WO 2014/022638   2/2014

OTHER PUBLICATIONS

Doherty M. F., et al., Conceptual Design of Distillation Systems, 2001, pp. 185-186 and 351-359, McGraw-Hill Higher Education, New York, NY.

(Continued)

*Primary Examiner* — Joseph D Anthony

(57) ABSTRACT

Azeotropic or azeotrope-like compositions are disclosed. The azeotropic or azeotrope-like compositions are mixtures of HFO-E-1,3,4,4,4-pentafluoro-3-trifluoromethyl-1-butene with a second compound selected from the group consisting of methyl formate and HFO-E-1,1,1,4,4,4-hexafluoro-2-butene. Also disclosed are processes of preparing a thermoplastic or thermoset foam by using such azeotropic or azeotrope-like compositions as blowing agents; of producing refrigeration by using such azeotropic or azeotrope-like compositions; of producing cooling; of producing heating; of using such azeotropic or azeotrope-like compositions as solvents; of producing an aerosol product by using such azeotropic or azeotrope-like compositions; of using such azeotropic or azeotrope-like compositions as heat transfer media; of extinguishing or suppressing a fire by using such azeotropic or azeotrope-like compositions; and of using such azeotropic or azeotrope-like compositions as dielectrics.

23 Claims, 2 Drawing Sheets

Related U.S. Application Data

(60) Provisional application No. 62/036,200, filed on Aug. 12, 2014.

(51) Int. Cl.
*C08J 9/14* (2006.01)
*C09K 3/30* (2006.01)
*C11D 7/50* (2006.01)

(52) U.S. Cl.
CPC ............... *C09K 3/30* (2013.01); *C09K 5/045* (2013.01); *C11D 7/50* (2013.01); *C08J 2203/12* (2013.01); *C08J 2203/162* (2013.01); *C08J 2203/184* (2013.01); *C09K 2205/104* (2013.01); *C09K 2205/126* (2013.01); *C09K 2205/32* (2013.01)

(56) References Cited

U.S. PATENT DOCUMENTS

| | | | | |
|---|---|---|---|---|
| 2008/0051612 A1* | 2/2008 | Knapp | ................. | C07C 21/18 570/178 |
| 2010/0243943 A1* | 9/2010 | Robin | ................. | A62D 1/0057 252/3 |
| 2011/0144216 A1* | 6/2011 | Hulse | ................. | A01N 29/02 514/757 |
| 2011/0147638 A1* | 6/2011 | Robin | ................. | A62D 1/0057 252/2 |
| 2011/0220832 A1* | 9/2011 | Robin | ................. | A62D 1/0057 252/2 |
| 2015/0191576 A1* | 7/2015 | Robin | ................. | C08J 9/146 252/8 |
| 2016/0137895 A1* | 5/2016 | Kontomaris | ................. | F25B 7/00 62/114 |
| 2016/0243389 A1* | 8/2016 | Robin | ................. | A62D 1/0057 |
| 2017/0028240 A1* | 2/2017 | Robin | ................. | A62C 99/0018 |
| 2018/0043199 A1* | 2/2018 | Robin | ................. | C11D 7/504 |

OTHER PUBLICATIONS

Null, Harold R., Phase Equilibrium in Process Design, Vapor-Liquid Equilibrium, 1970, pp. 124-126, Wiley-Interscience Publisher.

PCT International Search Report and Written Opinion (PCT/US2015/041666) dated Sep. 28, 2015, Kouroussenko, D Svetlana, Authorized Officer.

Reid et al., Properties of Gases and Liquids, Fluid Phase Equilibria in Multicomponent Systems, 1987, pp. 241-387, 4th Edition, McGraw Hill, New York, NY.

Walas, Stanley M. , Phase Equilibria In Chemical Engineering, Chapter 4: Activity Coefficients, 1985, pp. 165-244, Butterworth Publishers, Boston, MA.

\* cited by examiner

AZEOTROPIC AND AZEOTROPE-LIKE COMPOSITIONS OF HFO-E-1,3,4,4,4-PENTAFLUORO-3-TRIFLUOROMETHYL-1-BUTENE AND USES THEREOF

CROSS-REFERENCE TO RELATED APPLICATIONS

This is a divisional of U.S. patent application Ser. No. 15/323,982, filed Jan. 5, 2017, which is a 35 U.S.C. § 371 National Stage Application of International Application No. PCT/US2015/041666, filed Jul. 23, 2015, which claims priority to U.S. Provisional Application No. 62/036,200, filed Aug. 12, 2014. The entire content of each of these applications is hereby incorporated herein by reference.

BACKGROUND OF THE INVENTION

Field of the Disclosure

The present disclosure relates to azeotropic or azeotrope-like compositions of HFO-E-1,3,4,4,4-pentafluoro-3-trifluoromethyl-1-butene and a number of compounds including methyl formate and HFO-E-1,1,1,4,4,4-hexafluoro-2-butene.

Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that have both low ozone depleting potentials (ODPs) and low global warming potentials (GWPs). For example, HFO-E-1,3,4,4,4-pentafluoro-3-trifluoromethyl-1-butene has zero ODP and low GWP. Methyl formate also has zero ODP and low GWP.

SUMMARY OF THE INVENTION

This disclosure provides a composition consisting essentially of (a) HFO-E-1,3,4,4,4-pentafluoro-3-trifluoromethyl-1-butene and (b) a second compound selected from the group consisting of methyl formate and HFO-E-1,1,1,4,4,4-hexafluoro-2-butene; wherein the second compound is present in an effective amount to form an azeotropic or azeotrope-like mixture with HFO-E-1,3,4,4,4-pentafluoro-3-trifluoromethyl-1-butene.

DETAILED DESCRIPTION OF THE INVENTION

Figure 1:
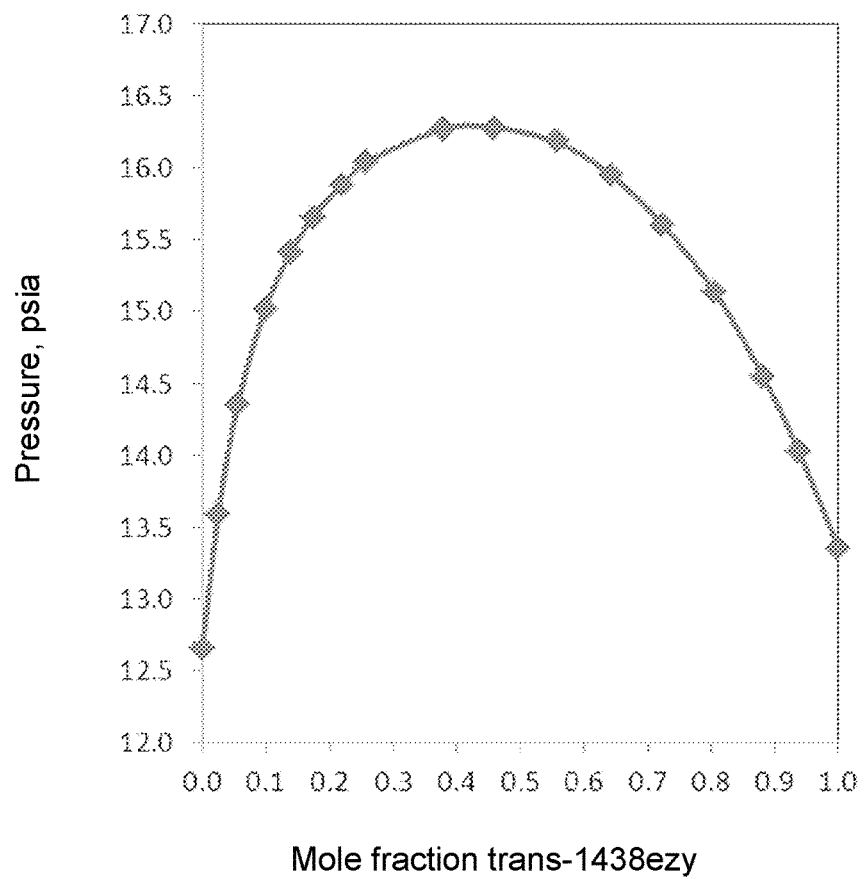
FIG. 1 is a graphical representation of an azeotropic composition of HFO-E-1,3,4,4,4-pentafluoro-3-trifluoromethyl-1-butene (HFO-E-1438ezy) and methyl formate at a temperature of about 27.8° C.

In many applications, the use of a pure single component or an azeotropic or azeotrope-like mixture is desirable. For example, when a blowing agent composition (also known as a foam expansion agent or a foam expansion composition) is not a pure single component or an azeotropic or azeotrope-like mixture, the composition may change during the foam forming process. Such a change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing HFO-E-1,3,4,4,4-pentafluoro-3-trifluoromethyl-1-butene (also referred to herein interchangeably as E-(CF$_3$)$_2$CFCH=CHF, HFO-E-1438ezy, or HFO-trans-1438ezy) in combination with a second compound selected from the group consisting of methyl formate and HFO-E-1,1,1,4,4,4-hexafluoro-2-butene.

Before addressing details of embodiments described below, some terms are defined or clarified. The following definitions are used herein to further define and describe the disclosure. These definitions apply to the terms as used throughout this specification, unless otherwise limited in specific instances.

HFO-1438ezy may exist as one of two configurational isomers, E or Z. The term "HFO-1438ezy", when used herein without a configurational signifier such as E or Z, refers to the isomers, HFO-Z-1438ezy or HFO-E-1438ezy, as well as any combinations or mixtures of such isomers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Provided herein are compositions consisting essentially of (a) HFO-E-1438ezy and (b) a second compound selected from the group consisting of methyl formate and HFO-E-1,1,1,4,4,4-hexafluoro-2-butene; wherein the second compound is present in an effective amount.

By "effective amount" is meant an amount, which, when combined with HFO-E-1438ezy, results in the formation of an azeotropic or azeotrope-like mixture. In this connection, those of skill in the art are aware that the proportion of the components in an azeotropic or azeotrope-like mixture may vary with the temperature or pressure at which the azeotropic or azeotrope-like mixture is distilled. Accordingly, the term "effective amount", as used herein, refers to the amount of each component in the mixture, which amounts may vary depending on the pressure applied to the composition so long as the azeotropic or azeotrope-like compositions continue to exist at the different pressures, but with possible different boiling points. Therefore, an "effective amount" includes the amounts, such as may be expressed in weight or mole percentages, of each component of the compositions of the instant invention which form azeotropic or azeotrope-like compositions at temperatures or pressures other than as described herein.

As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) is considered to be azeotrope-like.

It is further recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. The vapor-liquid equilibrium (VLE), and hence relative volatility, can be determined either isothermally or isobarically. The isothermal method requires measurement of the total pressure of mixtures of known composition at constant temperature. In this procedure, the total absolute pressure in a cell of known volume is measured at a constant temperature for various compositions of the two compounds. The isobaric method requires measurement of the temperature of mixtures of known composition at constant pressure. In this procedure, the temperature in a cell of known volume is measured at a constant pressure for various compositions of the two compounds. Use of the PTx Method is described in detail in "Phase Equilibrium in Process Design", Wiley-Interscience Publisher, 1970, written by Harold R. Null, on pages 124 to 126.

These measurements can be converted into equilibrium vapor and liquid compositions in the PTx cell by using an activity coefficient equation model, such as the Non-Random, Two-Liquid (NRTL) equation, to represent liquid phase nonidealities. Use of an activity coefficient equation, such as the NRTL equation, is described in detail in "The Properties of Gases and Liquids," 4th edition, published by McGraw Hill in New York in 1987, written by Reid, Prausnitz and Poling, on pages 241 to 387, and in "Phase Equilibria in Chemical Engineering," published by Butterworth Publishers in Boston in 1985, written by Stanley M. Walas, pages 165 to 244. Without wishing to be bound by any theory or explanation, it is believed that the NRTL equation, together with the PTx cell data, can sufficiently predict the relative volatilities of the HFO-E-1438ezy compositions of the present invention and can therefore predict the behavior of these mixtures in multi-stage separation equipment such as distillation columns.

It was found through experiments that HFO-E-1438ezy and methyl formate form azeotropic compositions.

To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

The temperatures measured versus the compositions in the PTx cell for the HFO-E-1438ezy/methyl formate system are shown in FIG. 1, which graphically illustrates the formation of an azeotropic composition consisting essentially of HFO-E-1438ezy and methyl formate as indicated by a mixture of about 42.1 mole % HFO-E-1438ezy and 57.9 mole % methyl formate having the highest pressure over the range of compositions at about 27.8° C.

Based upon these findings, it has been calculated that HFO-E-1438ezy and methyl formate form azeotropic compositions ranging from about 11.2 mole percent to about 46.5 mole percent HFO-E-1438ezy and from about 88.8 mole percent to about 53.5 mole percent methyl formate. These azeotropic compositions boil at a temperature of from about −40° C. to about 171° C. and at a pressure of from about 0.5 psia (3.4 kPa) to about 456 psia (3144 kPa).

For example, at 27.8° C. and 16.1 psia (111 kPa) the azeotropic composition consists essentially of 42.1 mole % HFO-E-1438ezy and 57.9 mole % methyl formate. In another example, at 25.4° C. and atmospheric pressure (14.7 psia, 101 kPa) the azeotropic composition consists essentially of 42.2 mole % HFO-E-1438ezy and 57.8 mole % methyl formate. Some embodiments of azeotropic compositions are listed in Table 1.

TABLE 1

Azeotropic Compositions

| Temp ° C. | Pressure PSIA | E-1438EZYT Mole-Frac | Methyl Formate Mole-Frac |
|---|---|---|---|
| −40 | 0.500851 | 0.464726 | 0.535273 |
| −30 | 0.973422 | 0.456538 | 0.543461 |
| −20 | 1.774033 | 0.449264 | 0.550735 |
| −10 | 3.05662 | 0.442647 | 0.557353 |
| 0 | 5.013813 | 0.436488 | 0.563511 |
| 10 | 7.87652 | 0.430638 | 0.569361 |
| 20 | 11.91157 | 0.424984 | 0.575015 |
| 27.78 | 16.0521 | 0.420666 | 0.579333 |
| 30 | 17.417862 | 0.419442 | 0.580557 |
| 40 | 24.721561 | 0.413956 | 0.586044 |
| 50 | 34.170861 | 0.408483 | 0.591516 |
| 60 | 46.130733 | 0.402996 | 0.597003 |
| 70 | 60.977886 | 0.397473 | 0.602526 |
| 80 | 79.095912 | 0.391886 | 0.608113 |
| 90 | 100.87026 | 0.386187 | 0.613812 |
| 100 | 126.682209 | 0.380273 | 0.619726 |
| 110 | 156.900279 | 0.373926 | 0.626073 |
| 120 | 191.866326 | 0.366661 | 0.633338 |
| 130 | 231.87177 | 0.357365 | 0.642634 |

Additionally, azeotrope-like compositions containing HFO-E-1438ezy and methyl formate may also be formed. According to calculation, azeotrope-like compositions consisting essentially of 1-99 mole % HFO-E-1438ezy and 99-1 mole % methyl formate are formed at temperatures ranging from about −40° C. to about 140° C. More specifically, over this temperature range, the difference in dew point pressure and bubble point pressure of the composition at a particular temperature is less than or equal to 5 percent, (based upon the bubble point pressure).

Such azeotrope-like compositions may exist above and below the upper and lower limits of azeotropic compositions. Some embodiments of azeotrope-like compositions are listed in Tables 2 and 3.

TABLE 2

Azeotrope-like compositions

| Components | T (° C.) | Mole Percentage Range |
|---|---|---|
| HFO-E-1438ezy/methyl formate | −40 | 27-75/25-73 93-99/1-7 |
| HFO-E-1438ezy/methyl formate | −20 | 26-77/23-74 89-99/1-11 |
| HFO-E-1438ezy/methyl formate | 0 | 25-99/1-75 |
| HFO-E-1438ezy/methyl formate | 20 | 1-2/98-99 22-99/1-78 |
| HFO-E-1438ezy/methyl formate | 40 | 1-4/96-99 18-99/1-82 |
| HFO-E-1438ezy/methyl formate | 60 | 1-99/1-99 |
| HFO-E-1438ezy/methyl formate | 80 | 1-99/1-99 |
| HFO-E-1438ezy/methyl formate | 100 | 1-99/1-99 |
| HFO-E-1438ezy/methyl formate | 120 | 1-99/1-99 |
| HFO-E-1438ezy/methyl formate | 140 | 1-99/1-99 |

TABLE 3

Azeotrope-like compositions

| Components | T (° C.) | Mole Percentage Range |
|---|---|---|
| HFO-E-1438ezy/methyl formate | −40 | 27-75/25-73 93-95/5-7 |
| HFO-E-1438ezy/methyl formate | −20 | 26-77/23-74 89-95/5-11 |
| HFO-E-1438ezy/methyl formate | 0 | 25-95/5-75 |
| HFO-E-1438ezy/methyl formate | 20 | 22-95/5-78 |
| HFO-E-1438ezy/methyl formate | 40 | 18-95/5-82 |
| HFO-E-1438ezy/methyl formate | 60 | 5-95/5-95 |
| HFO-E-1438ezy/methyl formate | 80 | 5-95/5-95 |
| HFO-E-1438ezy/methyl formate | 100 | 5-95/5-95 |
| HFO-E-1438ezy/methyl formate | 120 | 5-95/5-95 |
| HFO-E-1438ezy/methyl formate | 140 | 5-95/5-95 |

It has further been discovered that HFO-E-1438ezy and HFO-E-1,1,1,4,4,4-hexafluoro-2-butene form azeotrope-like compositions. To determine the relative volatility of this binary pair, the PTx method described above was used. Once more, he pressure in a PTx cell of known volume was measured at constant temperature for various binary compositions. These measurements were then reduced to equilibrium vapor and liquid compositions in the cell using the NRTL equation.

Figure 2:
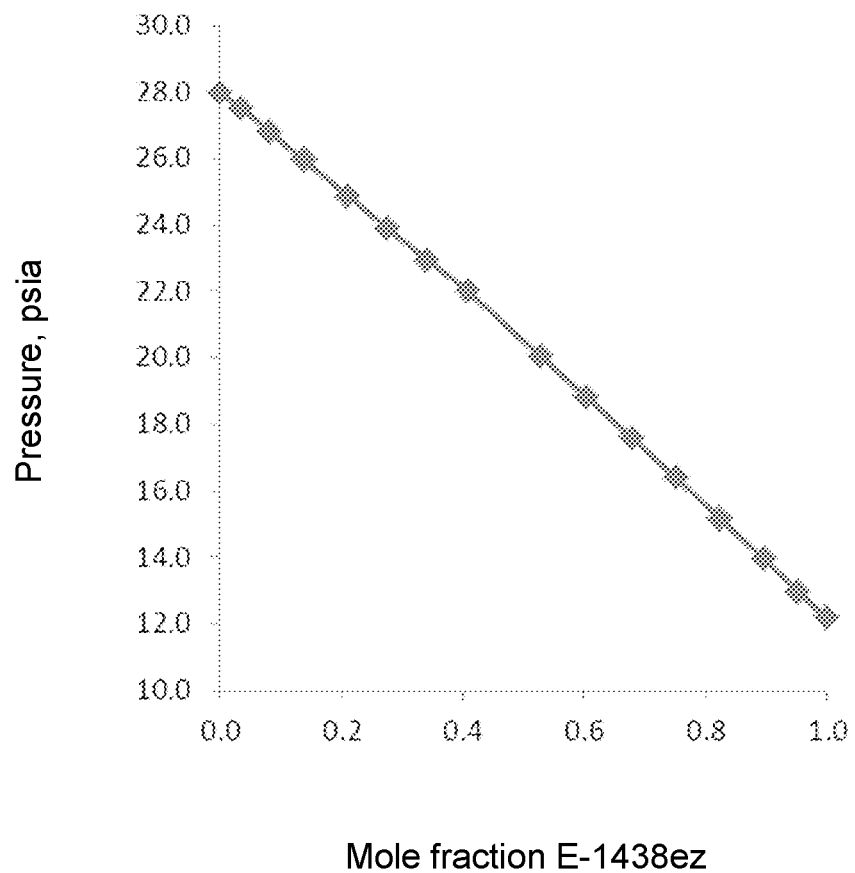
FIG. 2 is a graphical representation of an azeotrope-like composition of HFO-E-1,3,4,4,4-pentafluoro-3-trifluoromethyl-1-butene (HFO-E-1438ezy) and HFO-E-1,1,1,4,4,4-hexafluoro-2-butene at a temperature of about 24.8° C.

The pressures measured versus the compositions in the PTx cell for HFO-E-1,3,4,4,4-Pentafluoro-3-trifluoromethyl-1-butene and HFO-E-1,1,1,4,4,4-Hexafluoro-2-butene mixtures are shown in FIG. 2, which graphically illustrates the formation of azeotrope-like compositions consisting essentially of 1 to 9 mole % HFO-E-1,3,4,4,4-pentafluoro-3-trifluoromethyl-1-butene and 91 to 99 mole % HFO-E-1,1,1,4,4,4-hexafluoro-2-butene at 24.8° C. and pressures ranging from about 25 to 28 psia, and also illustrates the formation of azeotrope-like compositions consisting essentially of 94 to 99 mole % HFO-E-1,3,4,4,4-Pentafluoro-3-trifluoromethyl-1-butene and 1 to 6 mole % HFO-E-1,1,1,4,4,4-Hexafluoro-2-butene at 24.8° C. and pressures ranging from about 12 psia.

According to calculation, azeotrope-like compositions consisting essentially of 1-32 mole % and 76-99 mole % HFO-E-1,3,4,4,4-Pentafluoro-3-trifluoromethyl-1-butene and 68-99 mole % and 1-24 mole % HFO-E-1,1,1,4,4,4-Hexafluoro-2-butene are formed at temperatures ranging from about −40° C. to about 120° C. (i.e., over this temperature range, the difference in dew point pressure and bubble point pressure of the composition at a particular temperature is less than or equal to 5 percent (based upon the bubble point pressure)).

Some embodiments of azeotrope-like compositions are listed in Table 4.

TABLE 4

Azeotrope-like compositions

| Components | T (° C.) | Mole Percentage Range |
|---|---|---|
| HFO-E-1,3,4,4,4-Pentafluoro-3-trifluoromethyl-1-butene/HFO-E-1,1,1,4,4,4-Hexafluoro-2-butene | −40 | 1-4/96-99 97-99/1-3 |
| HFO-E-1,3,4,4,4-Pentafluoro-3-trifluoromethyl-1-butene/HFO-E-1,1,1,4,4,4-Hexafluoro-2-butene | −20 | 1-5/95-99 97-99/1-3 |
| HFO-E-1,3,4,4,4-Pentafluoro-3-trifluoromethyl-1-butene/HFO-E-1,1,1,4,4,4-Hexafluoro-2-butene | 0 | 1-7/93-99 96-99/1-4 |
| HFO-E-1,3,4,4,4-Pentafluoro-3-trifluoromethyl-1-butene/HFO-E-1,1,1,4,4,4-Hexafluoro-2-butene | 20 | 1-9/91-99 94-99/1-6 |
| HFO-E-1,3,4,4,4-Pentafluoro-3-trifluoromethyl-1-butene/HFO-E-1,1,1,4,4,4-Hexafluoro-2-butene | 40 | 1-11/89-99 93-99/1-7 |
| HFO-E-1,3,4,4,4-Pentafluoro-3-trifluoromethyl-1-butene/HFO-E-1,1,1,4,4,4-Hexafluoro-2-butene | 60 | 1-13/87-99 91-99/1-9 |
| HFO-E-1,3,4,4,4-Pentafluoro-3-trifluoromethyl-1-butene/HFO-E-1,1,1,4,4,4-Hexafluoro-2-butene | 80 | 1-17/83-99 88-99/1-12 |
| HFO-E-1,3,4,4,4-Pentafluoro-3-trifluoromethyl-1-butene/HFO-E-1,1,1,4,4,4-Hexafluoro-2-butene | 100 | 1-22/78-99 84-99/1-16 |
| HFO-E-1,3,4,4,4-Pentafluoro-3-trifluoromethyl-1-butene/HFO-E-1,1,1,4,4,4-Hexafluoro-2-butene | 120 | 1-32/68-99 76-99/1-24 |

The azeotropic or azeotrope-like compositions of the present invention can be prepared by any convenient method including mixing or combining the desired amounts. In one embodiment of this invention, an azeotropic or azeotrope-like composition can be prepared by weighing the desired component amounts and thereafter combining them in an appropriate container.

The azeotropic or azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents.

One embodiment of this invention provides a process for preparing a thermoplastic or thermoset foam. The process comprises using an azeotropic or azeotrope-like composition as a blowing agent, wherein said azeotropic or azeotrope-like composition consists essentially of HFO-E-1438ezy and a second compound selected from the group consisting of methyl formate and HFO-E-1,1,1,4,4,4-hexafluoro-2-butene.

Another embodiment of this invention provides a process for producing refrigeration. The process comprises condensing an azeotropic or azeotrope-like composition and thereafter evaporating said azeotropic or azeotrope-like composition in the vicinity of the body to be cooled, wherein said azeotropic or azeotrope-like composition consists essentially of HFO-E-1438ezy and a second compound selected from the group consisting of methyl formate and HFO-E-1,1,1,4,4,4-hexafluoro-2-butene.

Another embodiment of this invention provides a process for producing cooling. The process comprises condensing an azeotropic or azeotrope-like composition and thereafter evaporating said azeotropic or azeotrope-like composition in the vicinity of the body to be cooled, wherein said azeotropic or azeotrope-like composition consists essentially of HFO-E-1438ezy and a second compound selected from the group consisting of methyl formate and HFO-E-1,1,1,4,4,4-hexafluoro-2-butene.

Another embodiment of this invention provides a process for producing heating. The process comprises condensing an azeotropic or azeotrope-like composition in the vicinity of the body to be heated and thereafter evaporating said azeotropic or azeotrope-like composition, wherein said azeotropic or azeotrope-like composition consists essentially of HFO-E-1438ezy and a second compound selected from the group consisting of methyl formate and HFO-E-1,1,1,4,4,4-hexafluoro-2-butene.

Another embodiment of this invention provides a process for using an azeotropic or azeotrope-like composition as a solvent, wherein said azeotropic or azeotrope-like composition consists essentially of HFO-E-1438ezy and a second compound selected from the group consisting of methyl formate and HFO-E-1,1,1,4,4,4-hexafluoro-2-butene.

Another embodiment of this invention provides a process for producing an aerosol product. The process comprises using an azeotropic or azeotrope-like composition as a propellant, wherein said azeotropic or azeotrope-like composition consists essentially of HFO-E-1438ezy and a second compound selected from the group consisting of methyl formate and HFO-E-1,1,1,4,4,4-hexafluoro-2-butene.

Another embodiment of this invention provides a process using an azeotropic or azeotrope-like composition as a heat transfer media, wherein said azeotropic or azeotrope-like composition consists essentially of HFO-E-1438ezy and a second compound selected from the group consisting of methyl formate and HFO-E-1,1,1,4,4,4-hexafluoro-2-butene.

Another embodiment of this invention provides a process for extinguishing or suppressing a fire. The process comprises using an azeotropic or azeotrope-like composition as a fire extinguishing or suppression agent, wherein said azeotropic or azeotrope-like composition consists essentially of HFO-E-1438ezy and a second compound selected from the group consisting of methyl formate and HFO-E-1,1,1,4,4,4-hexafluoro-2-butene.

Another embodiment of this invention provides a process using an azeotropic or azeotrope-like composition as dielectrics, wherein said azeotropic or azeotrope-like composition consists essentially of HFO-E-1438ezy and a second compound selected from the group consisting of methyl formate and HFO-E-1,1,1,4,4,4-hexafluoro-2-butene.

While certain of the preferred embodiments of this invention have been described and specifically exemplified above, it is not intended that the invention be limited to such embodiments. Various modifications may be made without departing from the scope and spirit of the invention, as set forth in the following claims. Several patents and publications are cited in this description in order to more fully describe the state of the art to which this invention pertains. The entire disclosure of each of these patents and publications is incorporated by reference herein.

What is claimed is:

1. A composition consisting essentially of:
   (a) HFO-E-1,3,4,4,4-pentafluoro-3-trifluoromethyl-1-butene; and
   (b) methyl formate; wherein the methyl formate is present in an effective amount to form an azeotropic composition with the HFO-E-1,3,4,4,4-pentafluoro-3-trifluoromethyl-1-butene.

2. The composition of claim 1, consisting essentially of:
   (a) from about 11.2 mole percent to about 46.5 mole percent HFO-E-1,3,4,4,4-pentafluoro-3-trifluoromethyl-1-butene; and
   (b) from about 53.5 mole percent to about 88.8 mole percent methyl formate.

3. The composition of claim 2, consisting essentially of:
   (a) about 42.1 mole percent HFO-E-1,3,4,4,4-pentafluoro-3-trifluoromethyl-1-butene; and
   (b) about 57.9 mole percent methyl formate.

4. A composition consisting essentially of:
   (a) HFO-E-1,3,4,4,4-pentafluoro-3-trifluoromethyl-1-butene; and
   (b) methyl formate; wherein the methyl formate is present in an effective amount to form an azeotrope-like composition with the HFO-E-1,3,4,4,4-pentafluoro-3-trifluoromethyl-1-butene.

5. The composition of claim 4, consisting essentially of:
   (a) from about 1 to 99 mole percent HFO-E-1,3,4,4,4-pentafluoro-3-trifluoromethyl-1-butene; and
   (b) from about 1 to 99 mole percent methyl formate.

6. A process for preparing a thermoplastic or thermoset foam comprising using the azeotropic composition of claim 1 as a blowing agent.

7. A process for producing refrigeration comprising condensing the azeotropic composition of claim 1 and thereafter evaporating said azeotropic composition in the vicinity of a body to be cooled.

8. A process comprising using the azeotropic composition of claim 1 as a solvent.

9. A process for producing an aerosol product comprising using the azeotropic composition of claim 1 as a propellant.

10. A process comprising using the azeotropic composition of claim 1 as a heat transfer media.

11. A process for extinguishing or suppressing a fire comprising using the azeotropic composition of claim 1 as a fire extinguishing or suppression agent.

12. A process comprising using the azeotropic composition of claim 1 as a dielectric.

13. A process for producing cooling, comprising condensing the azeotropic composition of claim 1 and thereafter evaporating said azeotropic composition in the vicinity of the body to be cooled.

14. A process for producing heating, comprising condensing the azeotropic composition of claim 1 in the vicinity of a body to be heated and thereafter evaporating said azeotropic composition.

15. A process for preparing a thermoplastic or thermoset foam comprising using the azeotrope-like composition of claim 4 as a blowing agent.

16. A process for producing refrigeration comprising condensing the azeotrope-like composition of claim 4 and thereafter evaporating said azeotrope-like composition in the vicinity of a body to be cooled.

17. A process comprising using the azeotrope-like composition of claim 4 as a solvent.

18. A process for producing an aerosol product comprising using the azeotrope-like composition of claim 4 as a propellant.

19. A process comprising using the azeotrope-like composition of claim 4 as a heat transfer media.

20. A process for extinguishing or suppressing a fire comprising using the azeotrope-like composition of claim 4 as a fire extinguishing or suppression agent.

21. A process comprising using the azeotrope-like composition of claim 4 as a dielectric.

22. A process for producing cooling, comprising condensing the azeotrope-like composition of claim 4 and thereafter evaporating said azeotrope-like composition in the vicinity of the body to be cooled.

23. A process for producing heating, comprising condensing the azeotrope-like composition of claim 4 in the vicinity of a body to be heated and thereafter evaporating said azeotrope-like composition.

* * * * *